UNITED STATES PATENT OFFICE.

THOMAS SPENCER, OF SYRACUSE, NEW YORK.

IMPROVEMENT IN THE MANUFACTURE OF COMMON SALT.

Specification forming part of Letters Patent No. 30,165, dated September 25, 1860.

*To all whom it may concern:*

Be it known that I, THOMAS SPENCER, of Syracuse, in the county of Onondaga and State of New York, have invented a new and useful Improvement in Rendering Salt Anhydrous; and I do hereby declare and ascertain my said invention as follows:

Heretofore I have received Letters Patent for the employment of the carbonate of soda, or the bicarbonate, which makes a very pure article of salt. I now propose to employ the sulphate of soda of commerce mixed with the common salt of commerce, or a sulphate of soda made by the admixture of sulphuric acid and common salt, or in any other way manufactured.

The mode I use for rendering the common salt anhydrous is by the admixture of sufficient quantity of sulphate of soda (determined by the amount of the impurities of chloride of calcium or magnesium in said common salt) with said common salt after it has been drained as it is manufactured. The salt made in the usual way, after crystallization, is placed in proper receptacles to drain the mother-water therefrom, which also carries off all the impurities above named, except what adheres to the crystals of salt. To make this anhydrous by my process the sulphate of soda, or its equivalent, is then added to it in small but sufficient quantity to neutralize the injurious or deliquescent impurities remaining.

I am aware that sulphuric acid and sulphate of soda have both been used mixed with the brine or mother-water for the purpose of such neutralization; but that process requires too much of the chemicals, which are thereby wasted, rendering the process too expensive and difficult for commercial purposes.

Having thus fully described my improvements, what I claim, and desire to secure by Letters Patent, is—

The admixture, with common salt, after crystallization, of the sulphate of soda or its equivalent, as and for the purposes set forth.

THOS. SPENCER.

Witnesses:
JULIUS HENNIS,
J. J. GREENOUGH.